United States Patent [19]
Nilsson

[11] 3,975,064
[45] Aug. 17, 1976

[54] BALL BUSHING

[75] Inventor: Sven Walter Nilsson, Goteborg, Sweden

[73] Assignee: SKF Nova AB, Goteborg, Sweden

[22] Filed: May 2, 1975

[21] Appl. No.: 573,884

Related U.S. Application Data

[63] Continuation of Ser. No. 397,206, Sept. 13, 1973, abandoned.

[30] Foreign Application Priority Data

Sept. 15, 1972 Sweden.................................72110904

[52] U.S. Cl............................................. 308/6 C
[51] Int. Cl.$^2$......................................... F16C 29/06
[58] Field of Search .......................... 308/6 R, 6 C

[56] References Cited
UNITED STATES PATENTS

| | | | |
|---|---|---|---|
| 3,476,445 | 11/1969 | Carlson et al...................... | 308/6 C |
| 3,545,826 | 12/1970 | Magee et al ...................... | 308/6 C |
| 3,844,628 | 10/1974 | McCloskey ........................ | 308/6 C |

*Primary Examiner*—M. H. Wood, Jr.
*Assistant Examiner*—Gene A. Church
*Attorney, Agent, or Firm*—Daniel M. Rosen

[57] ABSTRACT

A ball bushing which comprises a sleeve and a shaft, and balls arranged therebetween. The balls are guided in a cage and, between the sleeve and shaft there are arranged load-carrying strips for the balls, characterized in that the sleeve of the ball bushing is shaped with a number of preferably circular envelope surface extending ridges showing a continuous cross-section basic profile. The interior of the sleeve is of polygon shape and in the middle of the polygon surfaces there are the apertures provided with a bottom intended to receive load-carrying strips for the balls in the loaded zone and also intended to center the cage element which in a corresponding manner is of polygon shape.

11 Claims, 6 Drawing Figures

FIG.4C
FIG.4A
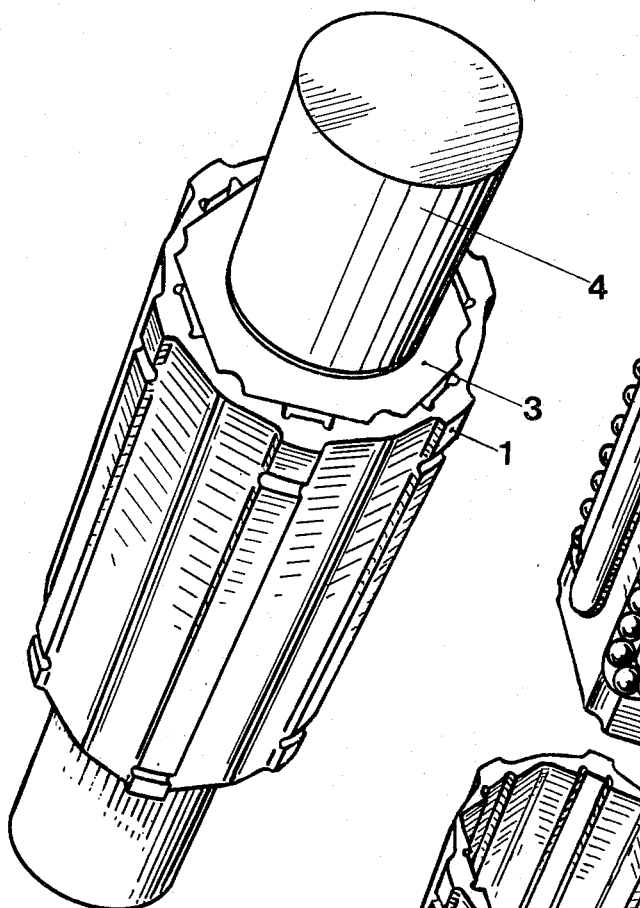
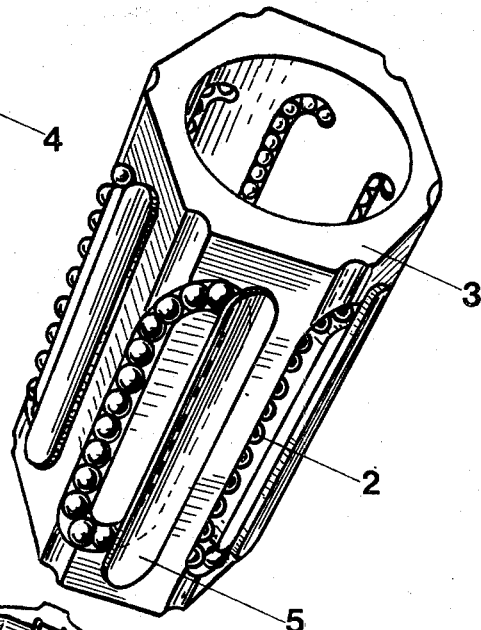
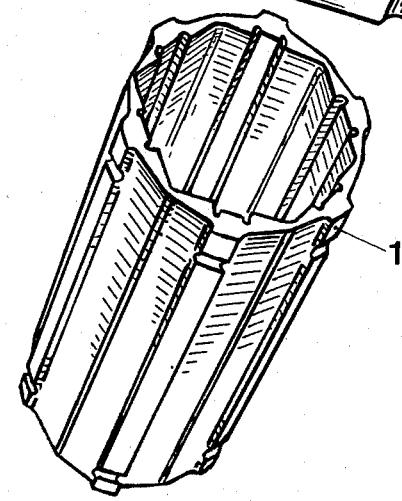
FIG.4B

BALL BUSHING

This is a continuation of application Ser. No. 397,206, filed Sept. 13, 1973, now abandoned.

The present invention relates to ball bushings and particularly ball bushings of the type comprising a sleeve and a cooperating shaft and balls arranged therebetween, said balls being guided in a cage element of the bushing forming a linear-motion ball bearing.

In earlier known designs, the sleeve generally has been made as an unbroken, cylindrical body or, if adjusting possibilities have been desired, as a split body.

It is advantageous however to provide adjustability without a split body.

It is therefore the object of this invention to provide a nonsplitted adjustable ball bushing.

The novelty of the invention relates to the shape of the sleeve, and is described in greater detail below with reference to the annexed drawings, in which FIG. 1 shows a longitudinal section through a ball bushing in accordance with the invention cut along line I—I in FIG. 2;

FIGS. 4A, 4B and 4C show perspective views of the ball bushing sections of FIGS. 1–3 in assembled form.

Figure 1:
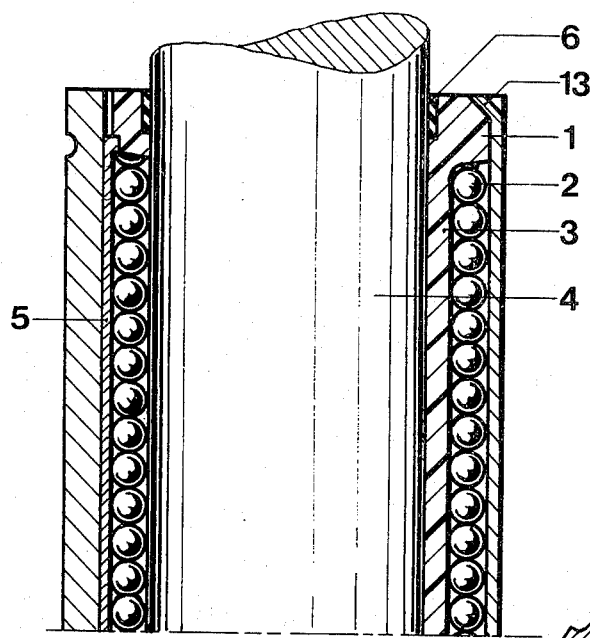

In FIG. 1, the main components of the ball bushing include the sleeve 1, the balls 2 in a loaded and a load-free or return zone, the loaded zone and return zone forming an endless ball raceway, the cage element 3 and the shaft 4. A supporting flat strip 5 is provided for the balls in the loaded zone and a sealing element 6 for the ball bushing.

Figure 2:
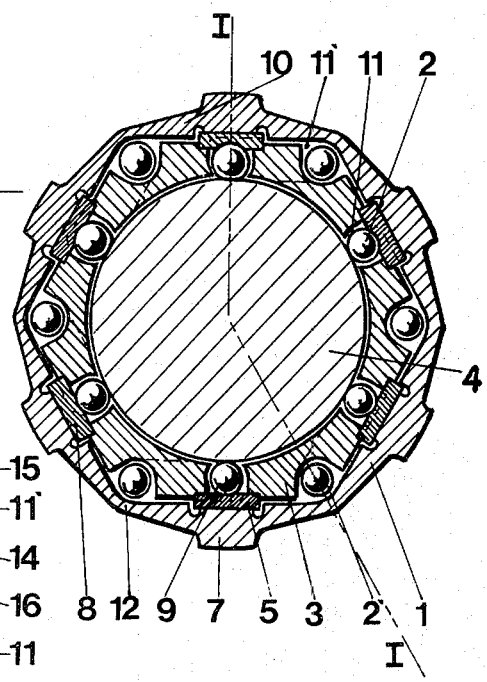
FIG. 2 illustrates a cross section through the bushing along line II—II in FIG. 3

Referring to FIG. 2 the shape of the sleeve is shown, and as shown is provided with a number of load supporting ridges 7 distributed along the periphery in an even pitch. The ridges extend from a preferably circular envelope surface of the sleeve. The sleeve might preferably be pressed by extrusion from aluminium or the like and shows along its whole length a continuous basic cross section. The interior of the sleeve is polygonal in shape, including any of the triangular, square, pentagonal, hexagonal, etc. shapes. In the middle of the polygonal surfaces there are apertures 8 provided with a bottom in which the load supporting strips 5 are fixed. The strips 5 are intended to support the balls in the loaded zone (here indicated by 2). The strips are made from a hard material, such as steel and may also be provided with grooves 9 for the balls in the loaded zone. The strips 5 may also be planar. The sleeve is shaped in such a way that a number of mainly plane, elastic bridges are formed, in the middle of which the ridges 7 and the apertures 8 are located. In such a way the circumscribed circle around the ridges might be varied within certain limits and an even adjusting against the balls in the loaded zone could be obtained without having the sleeve split. The sleeve could be defined as a plurality of axially-extending sections or walls, each of which has outer and inner surfaces and side edges thereof extending lengthwise, said sections situated circumferentially forming in cross-section a closed, unitary polygonal cylinder with junctions formed of side edges of adjacent sections. Since the sleeve as shown has radial thickness at the junctions substantially less than in the remainder of the sections, the shape of the sleeve is variable when stressed because the thin junctions as shown have less strength and are more flexible than the remainder of the sections forming the sleeve.

The cage element 3, which may be made for instance of plastic, is centered by the strips 5 and is not in contact with the sleeve 1 itself. The cage element is provided with inwardly facing open apertures or raceways 11 for the balls in the loaded zone and outwardly facing open recesses or grooves 11' for the re-circulating balls 2'. Thus, a number of ball circulation paths are realized in accordance with the number of polygonal surfaces, and are arranged in such a way that each path comprises one row of balls in the loaded zone and one row of recirculating balls. Each end of the ball path is united with return bends at 180°. The balls in the loaded zone are thus in contact on their outward side with the strips 5 and on their inward side with the shaft 4. The balls are guided in linear recesses 11 of the cage element. In order to obtain improved linear guiding, the balls are also guided in the grooves 9. The cage is thus an inner sleeve mating with said outer sleeve 1. The grooves 9 further influence the load capacity of the ball bushing owing to the good contact between the grooves and the balls. The re-circulating balls 2' are guided by the recess 11' and the polygon shaped corners 12, thus achieving a good linear guiding for these ball rows as well. The linear guiding of the balls is very important since a zigzig shaped motion of the balls creates increased friction against guiding wall surfaces and increased wear of groove and shaft surfaces. The semicircular return bend 11'' in the cage element 3 (see FIG. 3) has a bottom shape at the connection to the re-circulating recesses 11' which corresponds to said recesses and which continuously is transferred to the inwardly facing open recesses 11 intended for the balls 2. Since the cage element is not in direct contact with the inner polygonal surfaces of the sleeve, there is no sliding friction between cage element and sleeve and therefore a desired elasticity is obtained and therewith an increased attachment in the ball bushing.

The cage element itself, when made by way of example of plastics, will be rather elastic. The cage element can be fixed axially by bending the polygon corners into chamfered pockets formed in the cage element (see FIG. 1 at 13).

Figure 3:
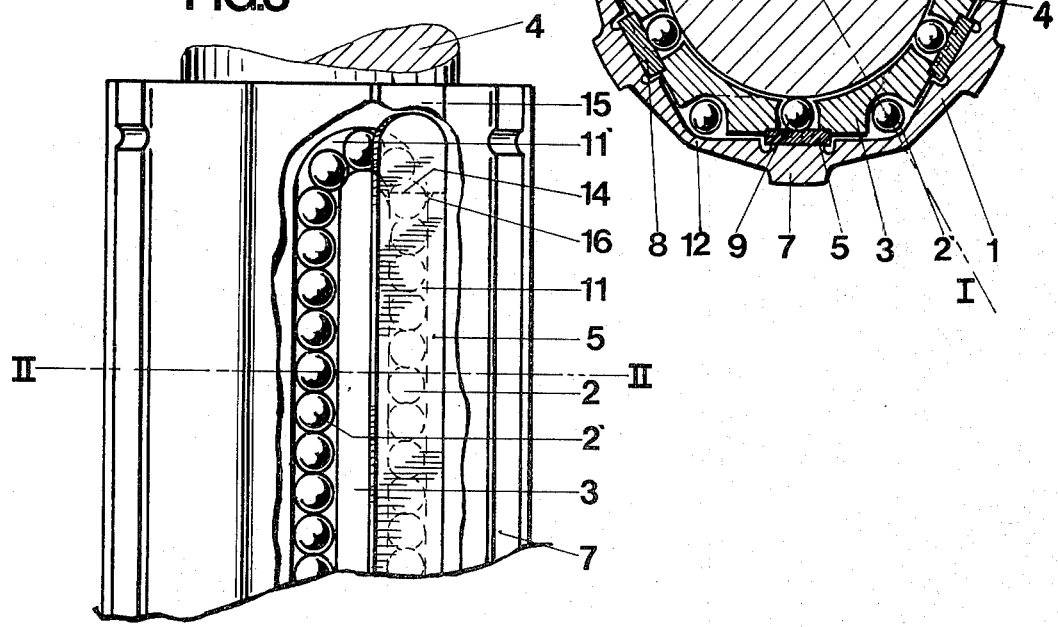
FIG. 3 shows a partly cut view of the bushing.

When the strips are shaped with contact grooves for the balls, the strips can, as shown in FIG. 3, be shaped in such a way that the strips from the dashed line 14 and against the edge plane of the cage element are cut down to the bottom of the groove so that a roof 15 is shaped. The balls can now circulate under the ceiling. In order to facilitate entrance, the grooves can be suitably provided with a funnel shaped entrance 16. The strips are shaped in a similar way at the exit for the balls. Even the cage element can suitably have a funnel-shape at the entrances and exits at the location of the recesses 11. The strips can be varied in many ways depending on whether they are provided with grooves or are plane. FIGS. 4A, 4B and 4C show perspective views of the ball bushing sections of FIGS. 1–3 in assembled form.

What is claimed is:

1. An adjustable ball bushing for use in guiding a central shaft, comprising a sleeve, a cage and a plurality of balls recirculating in channels in said cage between a loaded zone and a load-free zone, said sleeve surrounding said cage, a plurality of spaced longitudinal ridges extending along the length of the periphery of said sleeve, said sleeve having an internal polygonal shape with sections of decreasing strength on either side of said ridges, said ridges and the remaining periphery portion of said sleeve between said ridges being relatively elastic with respect to each other, and a loading strip placed along each ridge, each said loading strip spacing said cage from said sleeve so that there is no sliding friction between said cage and said sleeve, wherein said cage includes a plurality of outer channels in said load-free zone for said recirculating balls, said outer channels positioned within said polygonally internally shaped sleeve along a guiding corner formed by and between adjacent polygonal internal walls of said sleeve.

2. An adjustable bushing for use in guiding a central shaft, comprising a sleeve, a cage and a plurality of balls recirculating in channels in said cage between a loaded zone and a load-free zone, said sleeve surrounding said cage, a plurality of spaced longitudinal ridges extending along the length of the periphery of said sleeve, said ridges and the remaining periphery portion of said sleeve between said ridges being relatively elastic with respect to each other, and a loading strip placed along each ridge, said cage supported within said sleeve on each said strip, said loading strips spacing said cage from said sleeve so that there is no sliding friction between said cage and said sleeve, a plurality of said recirculating balls passing through each loaded zone rolling along said loading strip for transmitting force through said loading strip from the ridge associated with said loading strip to said shaft.

3. In a linear-motion ball bearing for use on a shaft, the bearing including a cylindrical sleeve having a bore for receiving a cooperating shaft, a plurality of endless ball-raceways defined between said shaft and said sleeve and circumferentially spaced around said sleeve, a plurality of balls substantially filling said raceways, each of said raceways having a loaded zone and a return zone, and a cage for guiding said balls in said raceways, the improvement in combination therewith, wherein said sleeve comprises a plurality of axially-extending sections, each of which has outer and inner surfaces and side edges thereof extending lengthwise, said section situated circumferentially forming in cross-section a closed, polygonal cylinder with junctions formed of side edges of adjacent sections, said junctions being more flexible than the remainder of said sections, parts of said inner surfaces of the sections comprising load-supporting surfaces extending lengthwise and situated adjacent and facing said shaft, the loaded zone of each raceway defined by said inner surfaces and adjacent surfaces on said shaft, and said return zone defined in said sleeve, whereby said sleeve junctions are deformable radially while the bearing remains operable via the loaded zones of the raceways.

4. A bearing according to claim 3, wherein said junctions have radial thickness less than radial thickness of the remainder of said sections.

5. A bearing according to claim 3, wherein said sleeve further comprises, on each of said section's inner surfaces, a load supporting strip extending lengthwise and having an inner surface facing said shaft and an opposite outer surface, the loaded zone of each raceway defined by said strip inner surface and an adjacent surface on said shaft.

6. A bearing according to claim 3, wherein said junctions are elastic.

7. A ball-bearing assembly for guiding a shaft axially within the assembly which comprises mating outer and inner sleeves, with continuous recirculation ball-channels comprising loaded and non-loaded zones defined by said sleeves and shaft, and a plurality of balls substantially filling said channels, the inner sleeve comprising a plurality of longitudinal walls each having a central part and two side edges and longitudinal junctions of adjacent side edges, said walls defining an axial bore for receiving said shaft therethrough, said outer sleeve comprising a plurality of longitudinal walls having central parts, side edges and junctions similar to said inner sleeve, the radial thickness of the outer sleeve junctions being less than the radial thickness of the central parts thereof, a longitudinal loading strip located between and spacing said sleeves and having an inwardly facing bearing surface, said inner sleeve defining a longitudinal groove on the outer surface of each junction thereof and a longitudinal raceway extending radially through each central part, the non-loaded zone of each recirculation channel defined by one of said inner sleeve grooves and one of said adjacent outer sleeve junctions, said nonloaded zone dimensioned to permit free movement of the balls therethrough, the loaded zone of each recirculation channel defined by a bearing surface of one of said loading strips, an adjacent portion of the shaft spaced radially inward therefrom with balls between and engaging said strip and shaft and guided in an adjacent raceway of said inner sleeve, this assembly being adjustable in that said outer sleeve junctions are flexible and deflect for accommodating variations in dimensions and loading of components of said assembly.

8. An assembly according to claim 7, wherein said inner and outer surfaces of the outer and inner sleeves respectively comprises in transverse cross-section generally symmetrical, polygonal shapes.

9. An assembly according to claim 8, wherein said polygonal shape is hexagonal.

10. An assembly according to claim 7, wherein said outer sleeve, loading strips and inner sleeve, are fixedly engaged precluding relative axial movement, and said outer sleeve is axially movable relative to said shaft with said balls in the loaded zones providing anti-friction, rolling contact therebetween.

11. An adjustable ball bearing assembly for guiding a central shaft in relative axial movement, comprising mating outer and inner sleeves, with an axial bore in said inner sleeve for receiving said shaft therethrough, the inner sleeve being a ball-retaining cage and partially defining therein a plurality of continuous ball-recirculation channels each having a loaded zone and a load-free zone, a plurality of balls substantially filling said channels, said outer sleeve comprising a plurality of circumferentially spaced longitudinal ridges extending along the length of its inner periphery, said outer sleeve having an internal polygonal shape and comprising longitudinal sections on either side of said ridges of less strength than and being relatively elastic with respect to said ridges, a loading strip situated along each ridge for spacing said cage from said outer sleeve to preclude sliding friction therebetween, each strip having a bearing surface facing inward and radially spaced from said shaft, said cage including a plurality of longitudinal grooves on the outer surface thereof and longitudinal raceways, said load-free zone of each of said ball-recirculation channels comprising one of said longitudinal grooves and radially spaced therefrom an inner surface of said outer sleeve, said loaded zone comprising a bearing surface of one of said strips, an adjacent surface of the shaft, and one of said longitudinal raceways as lateral guide surfaces, whereby said shaft is axially movable relative to said outer sleeve.

* * * * *

UNITED STATES PATENT AND TRADEMARK OFFICE
CERTIFICATE OF CORRECTION

PATENT NO. : 3,975,064
DATED : August 17, 1976
INVENTOR(S) : Sven Walter Nilsson It is certified that error appears in the above-identified patent and that said Letters Patent are hereby corrected as shown below:

Column 1, line 28 after "bushing" insert --or assembly--.

Column 3, line 42 change "section" to --sections--.

Signed and Sealed this

Thirtieth Day of May 1978

[SEAL]

Attest:

RUTH C. MASON
Attesting Officer

LUTRELLE F. PARKER
Acting Commissioner of Patents and Trademarks